Nov. 2, 1943.  A. E. CARTLIDGE  2,333,293
METAL SHEARING MACHINE AND THE LIKE
Filed Nov. 26, 1941
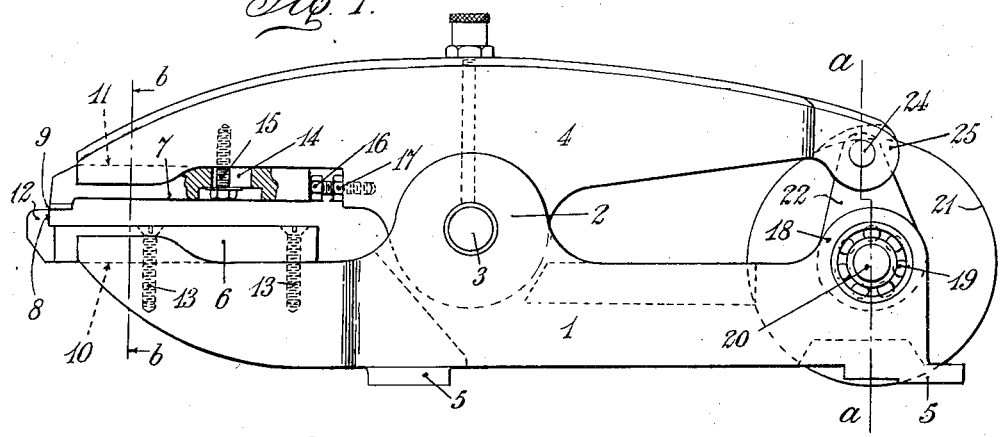
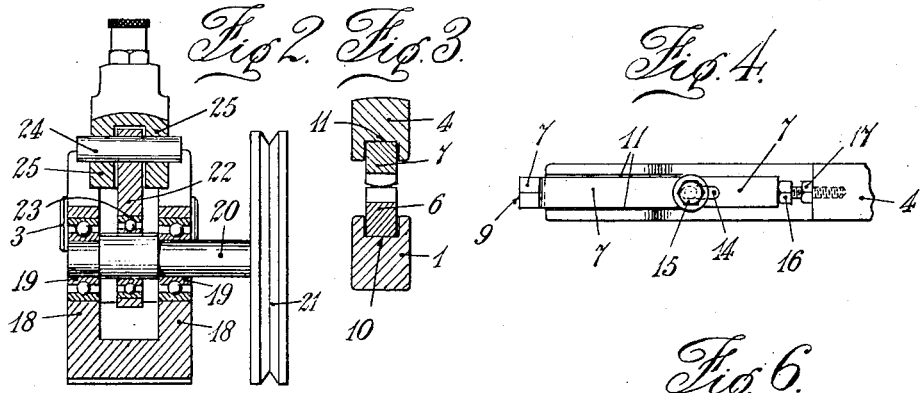
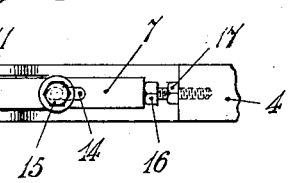
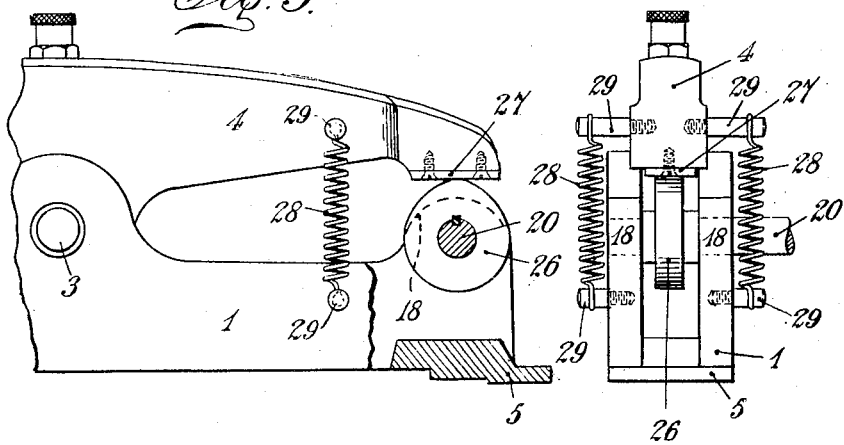
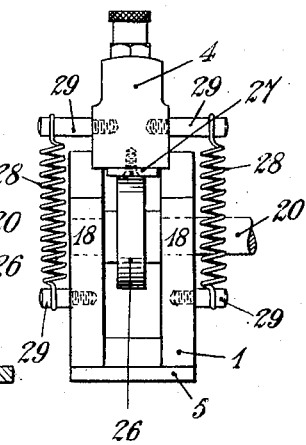
INVENTOR
Alfred E. Cartlidge
BY
ATTORNEY Patented Nov. 2, 1943

2,333,293

UNITED STATES PATENT OFFICE 2,333,293

METAL SHEARING MACHINE AND THE LIKE

Alfred Edward Cartlidge, California in England, Wokingham, England

Application November 26, 1941, Serial No. 420,594
In Great Britain December 17, 1940

2 Claims. (Cl. 164—43)

This invention relates to metal shearing machines and the like.

The object of this invention is to provide a machine which will shear metal or other material of flat or intricate shape in a quick and efficient manner.

A further object is to provide a shearing machine of simple character which will permit of the shaping of for instance the ends of metal tubes to any desired formation.

A still further object is to provide a shearing machine in which the movable cutter will operate at a high speed so as to provide a nibbling or like effect to enable material to be cut to intricate shapes upon the movement of such material during the shearing operation.

With these and other objects in view the invention consists in providing a shearing machine comprising a pair of longitudinal arm members pivoted together at an intermediate position, one end of said pair of members being fitted with cutting members and the other end of said pair fitted with means such as cam, eccentric or like means mounted on a shaft adapted to be rotated at a high speed to actuate the cutters whereby to provide a nibbling effect during the shearing operation, the cutting faces being arranged substantially parallel to the axis of the pivot or fulcrum of the longitudinal arm members.

The invention further consists in providing positive or resilient means to maintain the movable arm member in contact with the cam or eccentric means.

The invention still further consists in detachably mounting the cutting members longitudinally in the arms, providing means for their longitudinal adjustment and in providing one of the arm members with means for securing to a bench or other support.

The invention will now be described with reference to the accompanying drawing in which:

Figure 1 is a sectional elevation of one form of shearing machine constructed according to this invention;

Figure 2 is a cross sectional elevation taken on the line *a—a* of Figure 1;

Figure 3 is a cross section taken on line *b—b* of Figure 1;

Figure 4 is a detail of one of the cutting members adjustably mounted in the end of the upper arm member;

Figure 5 is a part sectional elevation of a modified construction and

Figure 6 is an end view thereof.

As shown more particularly in Figures 1 to 4, the improved shearing machine comprises a base member in the form of a longitudinal arm 1 formed intermediately of its ends with a pair of upstanding spaced ears 2 adapted to carry a fulcrum 3 for a further arm member 4 of substantially similar length to the lower arm 1. This latter arm 1 is formed with apertures, lugs or flanges 5 for bolting to a bench or other support. To the forward projecting portions of the arms 1 and 4 are fitted cutting or shearing members 6 and 7 in the form of stems having their cutting edges 8 and 9 arranged substantially at right angles to the said arms 1 and 4. These cutting members 6 and 7 are conveniently fitted in longitudinally arranged recesses or slots 10 and 11 formed in the ends of the arms 1 and 4 respectively. The lower cutting member 6 having an upturned nose 12 to form the cutting or shearing edge 8 is preferably fixed or secured to its carrying arm 1 by screws 13 or by dowels or other convenient means. The upper cutting member 7 of substantially similar shape is preferably adjustably mounted in the recess or slot 11 formed in the under side of the upper and movable arm 4. Conveniently the stem of this cutting member 7 is slotted at 14 for the reception of a guide and securing bolt 15 and the inner end of the stem is adapted to abut against adjusting means such as a pressure screw 16 screwed into the upper arm member 4, locking means such as a lock nut 17 being fitted on the said screw 16. Thus the upper cutting member 7 can be adjustably and detachably secured to the upper arm member 4 in such a manner as to permit an efficient shearing operation upon the downward movement of the upper cutter 7 in relation to the lower fixed cutter 6. The cooperating cutting edges 8 and 9 may be of any suitable shape either of angular or arcuate shape to permit of intricate shearing. The rear end of the base member 1 is formed with upstanding lugs 18 which are fitted with antifriction bearings 19 for a shaft 20 arranged at right angles to the said member 1. This shaft 20 is fitted with a pulley 21 so that it may be rotated by power means but if desired the shaft 20 may be manually operated. This power shaft 20 is also adapted to carry an eccentric 22 through the medium of an anti-friction bearing 23. This eccentric 22 is connected to a shaft or spindle 24 which is mounted in lugs 25 formed on the rear end of the upper arm 4. Thus the arm 4 will be rocked on its fulcrum 3 when the power shaft 20 is rotated. In an alternative construction as shown in Figures 5 and 6 the power shaft 20 is fitted with a cam or the like 26 which is adapted to co-operate with a hardened surface 27 formed or provided on the under side of the upper arm member 4. Suitable spring means are provided to maintain the rear end of the upper arm member 4 on the outer surface of the cam 26. Conveniently this is effected by a pair of helically coiled tension springs 28 connected at their ends to the upper and lower arm members 1 and 4 at each side thereof preferably through the medium of side extending arms 29. If desired, the hardened rubbing surface 27 may be in the form of a slightly tapered plate adjustably fitted to the end of the upper arm member 4 to contact with the cam 26. Thus the rubbing plate or surface 27 could be readily adjusted to vary the distance between the cutters 6 and 7 or to permit of the adjustment or replacement of the plate 27 when worn.

In a further alternative construction not shown the movable arm 4 may be positively rocked on its fulcrum 3 through the medium of an eccentric mounted on the power shaft and connected with the said arm 4 by an eccentric strap and a rod pivoted to the arm 4. Obviously the eccentric operation of the machine would obviate the use of springs. If desired means may be provided to adjust the length of the rod or the pivot thereof.

In operation it will be seen that when power is applied to rotate the shaft 20 the upper arm 4 will rock on its fulcrum 3 at a high speed and provide a nibbling effect to the cutter thereby enabling intricate shearing to be performed on work fed between the cutters 6 and 7. Owing to the small size of the cutters and the cutter carrying extensions of the arms it is possible to intricately shape the ends of tubes or other articles by a shearing operation.

What I claim is:

1. A shearing machine, including a pair of arms mounted intermediate their ends for relative pivotal movement, means at one end of the arms to compel operative relative movement of the opposite end of the arm, and cooperating cutting members carried by said last mentioned ends of the arms, said cutting members being removably mounted in channels in the proximate faces of the arms and extending beyond the ends of the cutting members being each formed in the portions extended beyond the ends of the arms as an integral nose, said noses being extended toward each other beyond the proximate longitudinal edges of the cutting members, the respective noses being of substantially the same width and each formed to provide a shearing surface spaced from and substantially parallel to the edge of the cutting member carrying said nose, the adjustment of a cutting member permitting relative varying in cutting overlap longitudinally of the shearing surfaces to provide varying cutting shapes in successive operation and under proper adjustment of the cutting member.

2. A shearing machine, including a pair of arms mounted intermediate their ends for relative pivotal movement, means at one end of the arms to compel operative relative movement of the opposite end of the arms, and cooperating cutting members carried by said last-mentioned ends of the arms, said cutting members being removably mounted in channels in the proximate faces of the arms and extending beyond the adjacent ends of the arms, the extended ends of the cutting members having laterally offset accurately-aligned noses extending toward each other and terminally formed to provide offset shearing surfaces, one of said surfaces being of arcuate form in cross section, the cooperating shearing surface being flat, the respective noses being of the same width transversely to permit varying cutting cooperation of the shearing surfaces.

ALFRED EDWARD CARTLIDGE.